United States Patent [19]

Palmquist

[11] 4,413,346
[45] Nov. 1, 1983

[54] GLASS-MELTING FURNACE WITH BATCH ELECTRODES

[75] Inventor: Ronald W. Palmquist, Horseheads, N.Y.

[73] Assignee: Corning Glass Works, Corning, N.Y.

[21] Appl. No.: 317,994

[22] Filed: Nov. 4, 1981

[51] Int. Cl.³ .............................................. C03B 5/027
[52] U.S. Cl. ...................................................... 373/41
[58] Field of Search ...................... 373/27, 29, 30, 39, 373/40, 41

[56] References Cited

U.S. PATENT DOCUMENTS

| | | | |
|---|---|---|---|
| 2,277,678 | 3/1942 | Borel | 373/36 |
| 2,978,526 | 4/1961 | Olson . | |
| 3,583,861 | 6/1971 | Preston . | |
| 3,818,112 | 6/1974 | Clishem et al. | 373/40 |
| 3,852,509 | 12/1974 | Rutledge et al. . | |
| 3,983,309 | 9/1976 | Faulkner et al. | 373/36 |
| 4,224,460 | 9/1980 | Swillinger . | |

Primary Examiner—Roy N. Envall, Jr.
Attorney, Agent, or Firm—John P. DeLuca

[57] ABSTRACT

In a glass-melting furnace, electrodes are inserted through the batch in symmetrical locations spaced from sidewalls of the furnace. Melting and refining take place in relatively narrow bands below the batch.

16 Claims, 3 Drawing Figures

GLASS-MELTING FURNACE WITH BATCH ELECTRODES

BACKGROUND OF THE INVENTION

This invention relates to glass-melting furnaces. More particularly, the invention relates to the use of electrodes inserted at selected locations through the batch of a vertical glass-melting furnace.

In an electric glass-melting furnace, electrodes are coupled to a source of electrical power and placed in contact with a bath of molten glass. Electrical energy flows between the electrodes and dissipates energy in the form of Joule heating in the molten glass for melting a blanket of glass-forming batch materials deposited on and floating atop the bath. Such electrodes may be inserted through openings in wall portions of the furnace as in conventional furnaces or may be directly placed in contact with the molten glass from above or through the layer of batch floating thereon as in the case of a cold crown electric melter.

A significant characteristic of a cold crown vertical furnace is its relatively great depth, e.g., 10'-15'. This depth is required in order to produce a specific convection pattern. An exemplary convection pattern comprises rapidly moving glass in the upper ⅔ of the furnace, sometimes hereinafter referred to as the active zone, and slower moving glass in the lower ⅓ of the furnace, sometimes hereinafter referred to as the quiescent zone. Such an arrangement gives the furnace the ability to produce quality glass at high melting rates, see U.S. Pat. No. 3,583,861. The present invention allows for the use of a relatively shallow furnace structure.

In conventional vertical furnaces, electrodes are located at the upper part of the walls near the batch blanket. Introduction of the power close to the wall causes the hottest spot in the furnace to be at the wall. As a result, the furnace suffers from high corrosion rates and a short life.

Another problem with conventional vertical furnaces is that the electrodes suffer from high corrosion and short life. The electrodes project horizontally through the furnace sidewall, and may consist of three rods with the lateral surface area oriented perpendicular to the path of electrical current flowing therebetween. Thus, corrosion is concentrated at the tip of the electrode.

In prior art furnaces, the depth of the furnace must be increased as one increases the diameter. This is partly the result of the electrical power being dissipated close to the walls so that the center of the furnace is much cooler and produces a strong downward convection which in turn reduces the thickness of the quiescent zone.

In general, electrodes positioned through the batch have the advantage of being radially and vertically adjustable within the batch blanket on the top surface of the furnace. This adjustability allows optimization of furnace performance for a particular output.

Batch electrodes are also more easily replaced than electrodes which extend through openings in the furnace sidewall. Consequently, the furnace is more reliable. Also, the batch electrode rod is now vertically placed within the furnace. With electrical current uniformly placed over the side of the rod, the corrosion of the electrode is minimized and electrode life increased.

Batch electrodes can be placed in a wide variety of positions. In general, these positions will coincide with the electrical phases available in a manner that symmetry of current flow from the electrodes is maintained. Symmetry of electrical placement and firing are important and have been found to favorably affect melting efficiency and enhance furnace life. For a suitable example, reference is directed to copending U.S. patent application Ser. No. 243,811 filed Mar. 16, 1981, now U.S. Pat. No. 4,366,571, issued Dec. 28, 1982, the teachings of which are considered to be incorporated herein by reference. The patent describes radial and circumferential arrangements of electrodes operated in a manner designed to achieve furnace symmetry.

In many glass-melting furnaces molybdenum (moly) is used as the preferred electrode material. However, because moly has a relatively low oxidation temperature of about 500° C., complex protection devices are required to shield the electrodes from deterioration by contact with oxygen trapped in the glass-forming batch materials and/or other corrosive agents therein. Such devices include conventional water-cooled stainless steel sleeves or specially fabricated glass contact refractory sleeves which surround the electrode (see Ser. No. 243,811 referred to above or U.S. Pat. Nos. 2,978,526 and 4,224,460). These devices are expensive and somewhat short lived. For example, water cooling tends to dissipate energy intended for glass-melting purposes and has a deleterious effect on melting efficiency and glass quality. Protection devices tend to be heavy and cumbersome and are not easily adjusted or replaced, thereby diminishing their versatility. Glass quality may also be effected by contamination of the glass by materials forming the protective devices which materials eventually corrode and become mixed with the glass in the furnace.

A preferred embodiment of the present invention utilizes a relatively inexpensive and long-lived system for directly immersing moly rods into a bath of thermoplastic material. The moly rods are protected from oxidation without complicated peripheral apparatus. The system requires no cooling, and thus, energy utilization is enhanced. Further, the moly rods are supported in a relatively simple holder thereby facilitating adjustment and replacement.

In a series of related U.S. patent application Ser. Nos. 317,995 and 317,996 filed this same date and assigned to the assignee herein, other embodiments and examples are disclosed. The teachings of such applications are considered incorporated herein by reference.

SUMMARY OF THE INVENTION

A method and apparatus is set forth for operating a glass-melting furnace having sidewall portions and a bottom wall forming a relatively shallow vessel for containing a bath of molten glass, wherein the furnace is electrically fired by at least one group of oxidizable electrodes inserted directly into the bath. The method includes the steps of placing each group of electrodes at selected locations about the furnace in a symmetrical circumferential pattern about a geometric center thereof, adjusting each group of placed electrodes to radial locations relative to said center which locations are relatively uniformly spaced from the center and at least a selected minimum distance from a sidewall portion of said furnace. Each electrode in a group is electrically fired in a symmetrical electrical pattern relative to each electrode in the group and each other group of electrodes such that heat energy within the furnace is concentrated away from the sidewall portions of the furnace. The number of electrodes and dimensions of the furnace are chosen such that melting and refining of glass occurs within respective relatively narrow bands below an upper surface of the bath.

DESCRIPTION OF THE PREFERRED EMBODIMENTS

Figure 1:
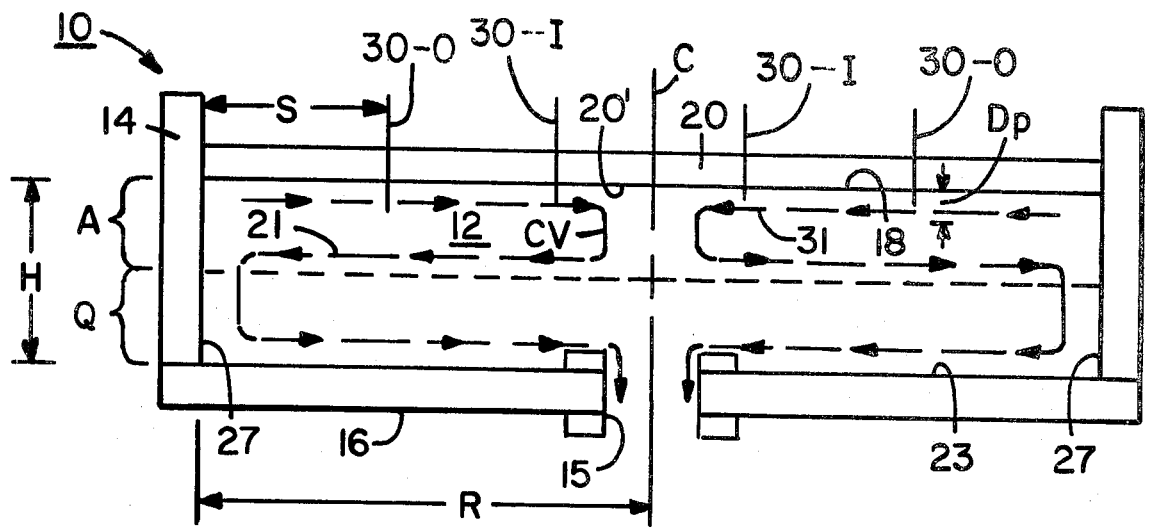
FIG. 1 is a schematic side sectional illustration of a preferred embodiment of a glass-melting furnace of the present invention including one exemplary batch electrode.

FIG. 1 shows a preferred embodiment of a vertical electric glass-melting furnace 10 of the present invention illustrated schematically in side section with cross hatching eliminated for clarity. Preferably the furnace 10 is polygonal or near circular having a geometric center C and radius R (see FIG. 2). The furnace 10 includes an upstanding sidewall 14 and a bottom wall 16 having an outlet opening 15 at center C. The furnace 10 contains a bath of molten thermoplastic material such as glass 12. The bath of molten glass 12 has an upper surface 18 upon which there is deposited a quantity of glass-forming batch materials or batch 20. The batch 20 is in the form of a floating blanket which insulates the surface 18 of the bath 12 and retains heat within the furnace 10. The molten glass 12 is initially melted by conventional means including a gas burner (not shown). Thereafter, continuous melting takes place by means of one or more groups of current-carrying electrodes 30 (subscripts sometimes omitted) inserted into the bath 12. Electrodes 30 closes and the sidewall 14 are labeled with the designation 0 for outer and the electrodes 30 closest the center C are labeled I for inner.

Each electrode 30 may be carried by suitable means for shown herein but clearly disclosed in any one of the above referred to U.S. patent applications. The electrodes 30 are free to be moved vertically, radially, circumferentially and angularly. Radial positioning of the electrodes 30 is especially important for maintaining proper heat distribution. The outer electrodes 30-O are placed no closer to the sidewalls 14 than a selected minimum spacing or distance S. Heat energy produced by outer electrodes 30-O is removed from sidewalls 14 rendering the same relatively cool in comparison to prior art furnaces.

It is well known that a temperature gradient in a glass melting furnace causes the glass to move in convective rolls. In one embodiment of the present invention it is preferred that the electrodes 30 produce heat directly under the batch blanket 20. The outer electrodes 30-O are fired with a greater power to produce more heat about the periphery of the furnace 10. The glass 12 in the furnace tends to move radially inwardly of the furnace and downwardly near the center C which is relatively cooler. The glass 12 moves in a convective roll pattern as hereafter described. The convective roll CV (see arrows) circulates across upper part of the furnace near the upper surface 18 radially inwardly towards center C, thence downwardly near the center towards an interface 21 separating upper active zone A from lower quiescent zone Q. The glass 12 meets the boundary 21 and tends to move radially outwardly from center C to sidewalls 14. Thereafter the glass 12 moves downwardly along sidewalls 14 towards bottom 16 and thence radially inwardly across bottom 16 towards the center C and to outlet 15.

The convective roll CV shown represents the path taken by freshly melted glass 12 having a minimum residence time in the furnace 10 necessary to produce a good quality product. It should be clear that some of the glass 12 recirculates in the furnace 10 and has a longer residence time. Also, other patterns are possible. For example in Ser. No. 243,811 if the outer electrodes 30-O are run cooler than the inner electrodes 30-I a "C" convection pattern will be formed. The glass moves along the top of the furnace, from the center C to sidewalls 14 and thence downwardly towards bottom 16 and across inwardly to central outlet 15. The "C" pattern provides for a shorter residence time, but in a hotter furnace as described therein high quality glass may be produced.

The power applied to the outer electrodes 30-O and minimum spacing thereof from sidewalls 14 is important for controlling the velocity and direction of the convective roll CV. Hot glass 12 tends to remain high in the furnace 12 and cool glass 12 tends to descend. The relative difference in glass temperature thus governs the rate at which glass 12 rises or descends in the furnace 10. If the outer electrodes 30-O are overpowered or placed too close to the sidewalls 14, heat energy concentrated at the electrodes 30-O will cause overheating and rapid corrosion of the sidewalls 14. Further, the flow of convective roll CV may be disrupted. Thus, the glass 12 may follow a path to outlet 15 which does not provide sufficient residence time to produce good quality glass. If the outer electrodes 30-O are far removed from sidewalls 14 a fast downward flow may occur near said sidewalls causing reduced residence time and increased furnace wear. Properly placed outer electrodes 30-O control the speed of the convective roll CV without overheating the sidewalls 14.

The furnace 10 has two major vertical zones. Initial melting of batch 20 takes place in the upper portion of the furnace 10, hereinbefore referred to as the active zone A. Fining takes place in lower portion of the furnace referred to as the quiescent zone Q. The respective active and quiescent zones A and Q are shown schematically separated by the dotted line 21.

In FIG. 1, the sidewalls 14 are shown as extending above the upper surface 18 of the glass 12. However, for purposes of discussion herein, the furnace can be said to have a height, depth or vertical dimension H as shown extending across the respective active and quiescent zones A and Q. This dimension does not necessarily include a sump (not shown) present in some furnaces.

Although the furnace may be constructed in various shapes and sizes, for purposes of simplifying the discussion and analysis herein, the furnace 10 may be considered to be circular having radius R as lateral dimension measured from the center to an interior surface 27 of sidewall 14. For near circular shapes the lateral dimension should be considered the shortest distance from the center line to the sidewall (for example, assuming a regular polygon: the short perpendicular to a side.) In noncircular arrangements the longer dimension should control (for example one half the width of a rectangle or the focal length of an elipse). In the discussion below, near circular shapes are emphasized because they are believed to be most efficient.

Figure 3:
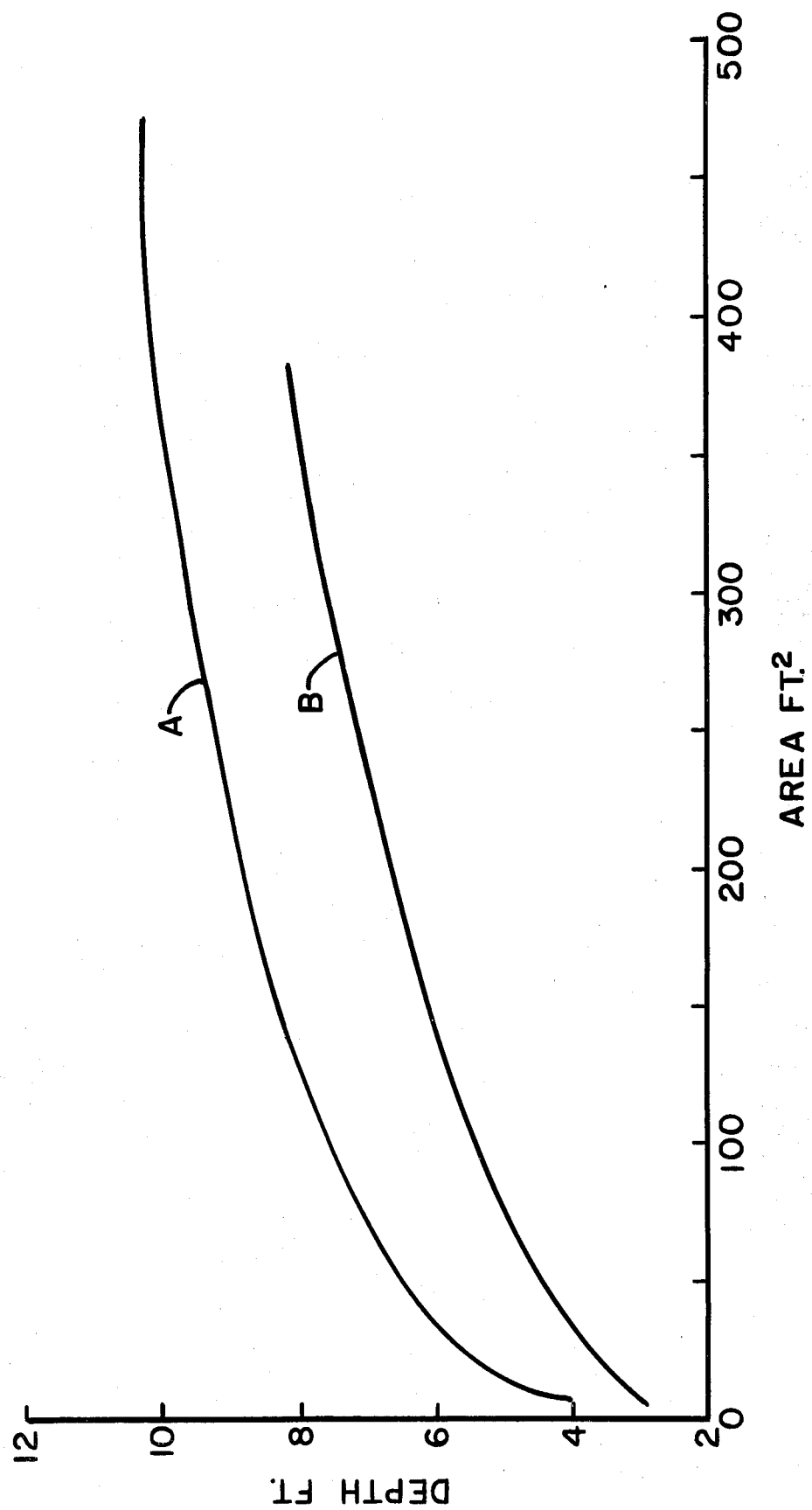
FIG. 3 is a plot of furnace height versus melting area for furnaces with and without batch electrodes.

FIG. 3 illustrates that a furnace 10 having batch electrodes may be significantly reduced in depth. Curve A shows the relation of depth versus surface area in a vertical refractory furnace with wall electrodes. Curve B shows the relation for the same type of furnace with batch electrodes. The curves are relatively close together for small furnaces (e.g. less than 25 ft$^2$). However as the furnace size increases the curves follow similar but offset paths. For example, in furnaces having a melting area of between about 100 and 300 ft$^2$ the furnace with batch electrodes may be about 2 ft. lower in depth. This is a significant reduction in depth which results in lower construction cost. The operating cost of such a furnace is also reduced due to lower heat loss for the smaller sidewall surface area. Notice that except for relatively small furnaces the depth should exceed at least 4' overall. In the range 100 ft$^2$–300 ft$^2$ plus, the depth of a furnace without batch electrodes increases to about 10 ft., including a 3' quiescent zone Q. In the same range a furnace with batch electrodes has a depth of about 8 ft. and a similar quiescent zone. The same quiescent zone is needed to refine the glass but a shallower active zone is needed for melting because of the improved efficiency of batch electrodes.

In a typical furnace made and operated in accordance with the present invention, an aspect ratio thereof may be defined as the vertical dimension H divided by the lateral dimension equal to the diameter D or twice the radius R. In a small furnace where D is about 5 feet or less the aspect ratio should not be less than about 1.0. As the diameter D increases, the aspect ratio should follow curve B in FIG. 3 to about 0.3. It should be understood however, that the shallowest furnace is desired for the particular lateral dimension chosen. Further, the dimensions should be chosen to minimize energy losses as much as possible.

Figure 2:
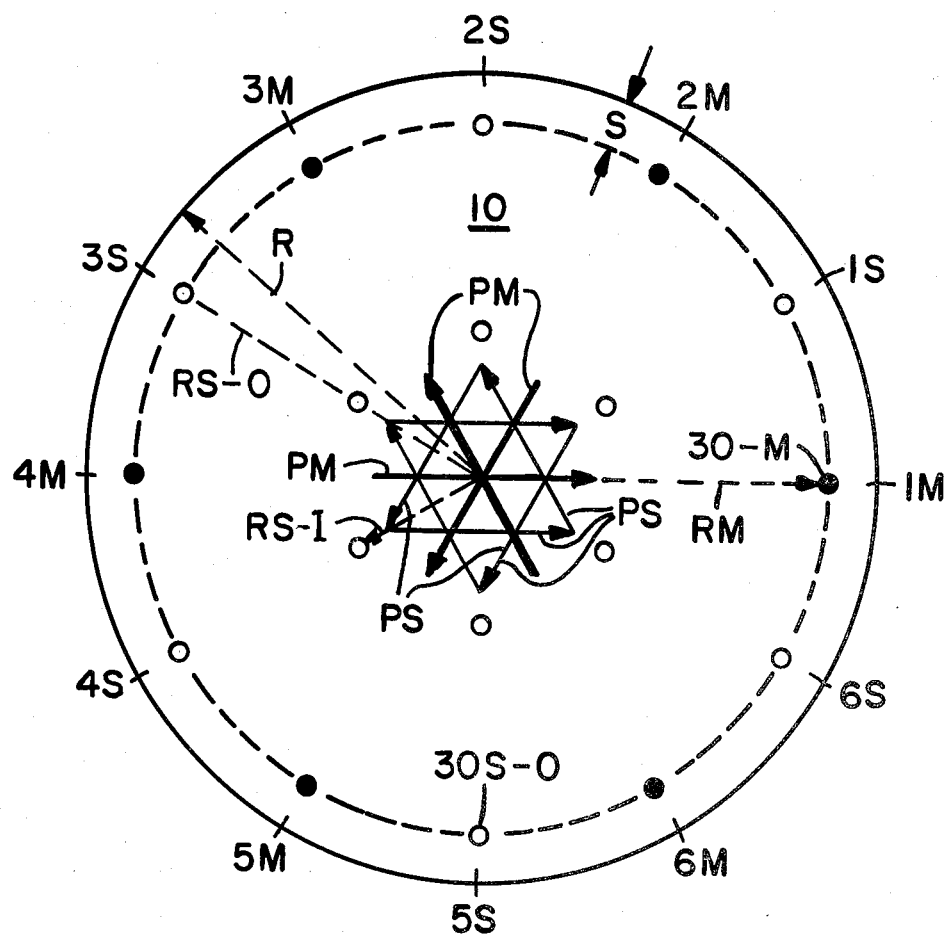
FIG. 2 is a schematic top plan view of a typical electrode layout for the furnace of FIG. 1 including a phasor diagram superimposed thereon.

In FIG. 2 there is shown a top plan view schematically illustrating a typical electrode layout for the furnace 10 of FIG. 1. In a furnace of the type herein described, two sets of electrodes are set out. A first set or group of six main electrodes 30M are located along radial lines at 60° intervals or positions (1M-6M) about the center C of the furnace 10. The main electrodes or mains 30M may be located at some radial position RM from the center C of furnace 10. The mains 30M (shown as dark circles) may be electrically energized by a source of power (not shown) in a cross fired arrangement producing phasors PM. A second set of six pairs of respective inner and outer staggered electrodes 30S-I, 30S-O shown as open circles, are interspersed at six locations 1S-6S circumferentially half-way between the main electrodes 30M. Similarly, the respective inner and outer staggered electrodes 30S-I and 30S-O may be located at respective radial positions RS-I and RS-O. Staggered electrodes 30S-O and 30S-I when energized produce a pair of phasor PS adjacent and in the same sense as each main phasor PM. Other possible arrangements also include aligning inner electrode 30S-I in line with mains 30M and cross fired. Also inner electrode 30S-I could be placed intermediate mains 30M and outer electrode 30S-O and independently fired. For a typical wiring arrangement see Rutledge et al., U.S. Pat. No. 3,852,509.

In FIGS. 1 and 2, assuming a substantially circular furnace 10 of radius R and depth H, the following are examples of electrode positions for various nominally sized furnaces:

EXAMPLE I

Furnace Radius R=10'
Furnace Depth H=7.5'
No. Electrodes=15-18
  six (6) mains 30M
  six (6) outer staggered 30S-O
  three (3) to six (6) inner staggered 30S-I

| Location | Radius | Angle between Electrodes | Position |
|---|---|---|---|
| 30M | RM = 9' | 60° | 1M-6M |
| 30S-O | RSO = 9' | 60° | 1S-6S (offset from mains by 30°) |
| 30S-I | RSI = 3-5 | 120-60° | on line with outer staggered electrodes |

Spacing S from sidewall 14=minimum 1' all electrodes

EXAMPLE II

Furnace Radius R=5'
Furnace Depth H=5'
No. Electrodes=9
  six (6) mains 30M
  three (3) staggered (inner)

| Location | Radius | Angle between Electrodes | Position |
|---|---|---|---|
| 30M | RM = 4' | 60° | 1M-6M |
| 30S-I | RM = 1.5-2 | 120° | 2S, 4S, 6S |

Spacing S from sidewall 14=minimum 1' all electrodes

EXAMPLE III

Furnace Radius R32 2.5'
Furnace Depth H=3'
No. Electrodes=3, 4 or 6
Position-RM=RS=1.5-2.0
Angle-120°, 90°, or 60°
Spacing S from sidewall 14=minimum 1' all electrodes In the present invention batch electrodes 30 (subscripts sometimes hereinafter omitted) may be set up as in Example I spaced from sidewalls 14 and placed along radial lines at 30° intervals. The radial position of each batch electrode 30 is a significant variable. Notice that batch electrodes 30 may be placed near the center C or near the sidewall 14 and that there may be more than one batch electrode 30 on any radial line. Further it is possible to provide symmetrical placement locations, such that, no two electrodes lie on the same radial line. By placing electrodes 30 in these positions, electrical symmetry of current flow is maintained.

Inner staggered electrodes 30S-I placed near the center C of the furnace 10 (e.g., at RS-I=R/2 or less), have two advantages. First, by providing power in the center C of the furnace 10, the melting rate in the center can be increased. In conventional furnaces the center ordinarily has the lowest melting rate since it is furthest from wall electrodes. By placing electrodes 30-I near the center, either the output of the furnace 10 can be increased or the wall temperature can be reduced.

A second advantage of placing inner staggered electrodes 30S-I near the center C of the furnace 10 is that the furnace 10 need not be as deep. Power concentrates near the underside 20' of the batch blanket 20 in the active zone A where melting is desired (see FIG. 1). Concentrating power near the batch blanket 20 tends to produce a relatively stable quiescent zone Q in about the lower ⅓ to ½ of the furnace 10. Ideally, the glass 12 in the quiescent zone Q tends to move slowly towards outlet 15 thereby providing sufficient residence time for the glass 12 to fine.

The placement of main electrodes 30M and outer staggered electrodes 30S-O near, but spaced from, the sidewall 14 of the furnace 10 has significant advantages in addition to those set forth above. The number of electrodes can be greatly reduced since there is better utilization of electrode surface area. That is, significant current flows from lateral surfaces 30 of electrodes 30 rather than from tip 31. For example, in a conventional furnace having a radius of 10', forty-eight (48) electrodes are used. With the present invention, electrode useage could be reduced to between twelve (12) and eighteen (18) electrodes.

In a large furnace having a diameter greater than about 5', batch electrodes 30 are placed around the periphery of the furnace 10 spaced from sidewall 14 by about 1-2 feet as well as near the center C thereof. By eliminating conventional wall electrodes and spacing electrodes 30M and 30S-O 1-2 feet from the wall, the temperature of the sidewall 14 and hence corrosion of the refractory, can be greatly reduced. In a small furnace 10, electrodes 30 should be placed closer than 1' to the sidewall in order to produce the desired "S" convection. If a "C" pattern is desired, the electrodes 30 could be placed at about R/2.

The invention operates as follows: At least one group of electrodes 30 are arranged in a pattern, one each in a selected position of the pattern relative to the geometric center C of the furnace 10. The pattern is symmetrical in radial and circumferential directions relative to the center C. Except for small furnaces placement of the electrodes 30 near the sidewalls is restricted to not closer than about 1 foot. Each electrode 30 or groups of electrodes may be carried separately by a dedicated support arm or other suitable device (not shown). Likewise, different ones of the various groups of electrodes 30 may be carried on a common support (also not shown). Thereafter, the electrodes 30 are then lowered into the furnace 10 through the batch blanket 20 and energized. (It should be noted that bare batch electrodes as set forth in Ser. No. 243,811 (U.S. Pat. No. 4,366,571) above may be used along with the method set forth for their protection). Energization of the electrodes should be symmetrical with each electrode in a group dissipating substantially the same energy as other ones in the group. The preferred embodiment seeks to produde uniform melting across the furnace with relatively high heat near but spaced from sidewalls 14 and somewhat lesser heat concentrated at the center C. Of course, other arrangements of electrical firing are possible and such should be tailored to the idiosyncracies of the furnace 10 to provide a heat distribution, which while not totally uniform, produces good quality glass.

The electrodes 30 may be operated with their tips 31 at a selected operating depth DP below the upper surface 18 of glass 12. Further, the depth of one group of electrodes, e.g., the mains 30M in FIG. 2, may be different than the depth of the staggered electrodes 30S-I and 30S-O. Also, adjustments may be made to vary the depth of individual electrodes if desired. However, for purposes of illustration herein, the operating depth DP of all the electrodes 30 is assumed to be the same and substantially constant once determined.

The drawing of FIG. 3 illustrates curves for relatively clear glasses. Such glasses tend to require a relatively thick active zone A because energy radiates toward the bottom 16 preventing the thermal stratification that produces a clearly defined quiescent zone Q. The temperature difference between the upper surface 18 of the glass 12 and the furnace bottom 16 may be as small as 25° C. The furnace must be deep enough to produce relatively distinct active and quiescent zones. Other so-called dark glasses tend to suppress radiation. The active and quiescent zones are probably more distinct and both may be somewhat narrower than in a furnace melting clear glass. The drawing of FIG. 3 represents the case where active and passive zones are broadest. It should be apparent that, except for small furnaces, the overall height of furnaces operated in accordance with the present invention may be reduced by about 2 feet.

For the clear glasses the tip 31 of the electrodes 30 should be placed as close to an underside 20' of the batch 20 without exceeding current density limits or creating hot spots in the blanket. The operating depth DP of each electrode 30 may be changed by means set forth in the above noted patent application and are not detailed herein. It can be readily appreciated that since adjustments to the operating depth DP are easily accomplished, adjustment of the operating characteristics of the furnace is facilitated. More efficient melting can be achieved because the location of the tip end 31 of each electrode 30 can be adjusted to best suit melting characteristics of the particular glass being melted.

While there has been described what are considered to be the preferred embodiments of the present invention it will be obvious to those skilled in the art that various changes and modifications may be made therein without departing from the invention, and it is intended in the appended claims to cover all such changes and modifications as fall within the true spirit and scope of the invention.

What is claimed is:

1. A method of operating a glass melting furnace having sidewalls, a bottom wall with a central opening therein forming an open top vessel for containing a bath of molten glass, and at least one group of electrodes for electrically firing the bath from a source of electrical energy, the method comprising the steps of:
   selecting individual placement locations for each electrode of each group, said individual placement locations being radially and circumferentially symmetrical relative to a geometric center of the furnace;
   limiting the selected placement locations away from the sidewalls of the furnace by a minimum spacing by about 1 to about 2 feet;
   placing one each of the electrodes of each group at the individual placement locations selected;
   depositing a batch blanket of fusible glass forming batch materials atop the bath of the molten glass;
   piercing the batch blanket with said electrodes;
   immersing from the top of the furnace a tip portion of said electrodes into the molten glass at each respective location to a selected immersion level immediately below the batch blanket, each tip portion being in relatively close proximity thereto;

electrically firing each group of electrodes in a symmetrical electrical pattern relative to each electrode in the group and each other group of electrodes such that energy dissipation is concentrated immediately below and across the batch blanket and away from the sidewalls of the furnace;

selecting a furnace having respective vertical and lateral dimensions such that melting and refining occurs in relatively narrow active and quiescent zones respectively below each other and an upper surface of the bath; and selecting an aspect ratio of the vertical dimension of the furnace measured vertically across the active and quiescence zones and a lateral dimension measured across the center from one sidewall to the other of between 1.0 and 0.3.

2. A method as set forth in claim 1 further comprising the steps of electrically firing the electrodes for conducting electrical currents through the bath of molten glass and concentrating energy dissipated adjacent to the batch blanket.

3. A method as set forth in claim 1 further comprising the step of establishing a convective flow in the bath of molten glass such that glass flows radially inwardly in the active zone under the batch blanket, downwardly along the center and radially outwardly immediately above the quiescent zone and downwardly along the sidewalls and radially inwardly along the bottom wall towards a central outlet therein thereby forming an "S" pattern from the top to the bottom of the furnace.

4. A method as set forth in claim 3 further comprising the step of selecting a rate of convective flow including the steps of: selecting a rate of electrical energy dissipation in the bath of molten glass for controlling the convective roll to the selected rate along said "S" pattern.

5. A method as set forth in claim 4 further comprising the step of selecting a minimum residence time for glass within the furnace including; maintaining the glass in motion in the general direction of the convective roll pattern and thereby maintaining the glass in the furnace for the selected minimum residence time.

6. A glass melting furnace comprising:
upstanding sidewalls and a bottom wall forming an open top vessel for containing a bath of molten glass having an upper free surface, vertical and lateral dimensions of the vessel being in such proportions that melting and refining occurs in relatively narrow respective upper and lower bands below the upper surface such that the upper band is at least equal in thickness to the lower band, the vertical and lateral dimensions of the furnace are in an aspect ratio of between about 1.0 and 0.3;

at least one group of electrically energizable electrodes entering the furnace through the open top, said electrodes being in contact with the molten glass through the upper free surface thereof and relatively close thereto for concentrating electrical energy near and across said upper free surface, said electrodes being placed at selected locations circumferentially and radially symmetrical relative to a geometric center of the vessel and spaced from the sidewall thereof by a selected minimum distance of about between 1 and 2 feet.

7. A furnace as defined in claim 6 wherein each electrode in each group of electrodes is located at a correspondingly radial distance from the center of the furnace, and said electrodes in each group is spaced at uniform circumferential locations about said center.

8. A furnace as defined in claim 7 wherein the groups of electrodes comprise at least two groups and each group is located at the same radial distance from the center of the furnace as the other and at alternate circumferential locations.

9. A furnace as defined in claim 8 further including a third group of electrodes each located at a radial distance less than that of the other groups and uniformly circumferentially located about the center of the furnace.

10. A furnace as defined in claim 9 wherein the electrodes of the third group are located along radial lines in correspondence with at least one of the first and second groups of electrodes.

11. A furnace as defined in claim 6 comprising one group of three electrodes wherein the radial distance is approximately 50%–80% the distance from the center to the sidewall.

12. A furnace as defined in claim 6 comprising two groups of six electrodes, the radial distance being approximately 70–90% the distance from the center to the sidewall and each electrode in one group is offset approximately 30° from adjacent electrodes in the other and 60° from adjacent electrodes in the same group.

13. A furnace as defined in claim 12 further comprising a third group of at least three electrodes each being located at a radial distance approximately 30%–50% the distance from the center to sidewall of the furnace and spaced 120 apart.

14. A furnace as defined in claim 13 wherein the third group of electrodes comprises at least six electrodes spaced 60 apart.

15. A furnace as defined in claim 6 wherein the vertical and lateral dimensions of the vessel are respectively taken across the active and quiescent zones and from the center to an interior surface of the sidewall and said vertical and lateral dimensions are in an aspect ratio of not more than about 1.0 for a relatively small furnace, having a diameter of about less than 5 ft., to about 0.4 for a relatively large furnace, and wherein the vertical dimension is approximately a minimum of about 4 feet and the lateral dimension ranges from about 5 feet for a relatively small furnace and about 22 feet for a relatively large furnace.

16. A furnace as defined in claim 15 wherein the vertical dimension is reduced by about one foot for a relatively small furnace and about 2 feet for a relatively large furnace.

* * * * *

UNITED STATES PATENT AND TRADEMARK OFFICE
CERTIFICATE OF CORRECTION

PATENT NO. : 4,413,346
DATED : November 1, 1983
INVENTOR(S) : Ronald W. Palmquist It is certified that error appears in the above-identified patent and that said Letters Patent is hereby corrected as shown below:

Column 3, line 42, "for" should be changed to --not--.

Column 6, line 40, "R32 2.5'" should be changed to --R =2.5'--.

Column 7, line 54, "produde" should be changed to --produce--.

Signed and Sealed this

Twenty-ninth Day of May 1984

[SEAL]

Attest:

GERALD J. MOSSINGHOFF

*Attesting Officer*     *Commissioner of Patents and Trademarks*